United States Patent [19]

Moya

[11] 4,041,452
[45] Aug. 9, 1977

[54] A ROTATING BEACON FOR A BICYCLE

[76] Inventor: Castulo J. Moya, 8166 Molokai Way, Fair Oaks, Calif. 95628

[21] Appl. No.: 592,754

[22] Filed: July 3, 1975

Related U.S. Application Data

[63] Continuation-in-part of Ser. No. 548,254, Feb. 10, 1975, abandoned.

[51] Int. Cl.$^2$ .............................. B62J 3/00; B62J 5/00
[52] U.S. Cl. .......................................... 340/134; 46/58; 116/28 R; 116/41; 240/7.55; 240/6.4 R; 240/10.1; 340/84; 340/87
[58] Field of Search ...................... 116/63 R, 63 F, 28, 116/41; 40/125 G, 125 N, 129 R, 39; 340/134, 84, 87, 25, 50, 133; 240/7.55, 49, 10.1, 58, 8.1; 46/53, 58

[56] References Cited

U.S. PATENT DOCUMENTS

| | | | |
|---|---|---|---|
| 2,810,065 | 10/1957 | Peck | 240/7.7 |
| 3,374,763 | 3/1968 | Browning | 116/63 P |
| 3,786,583 | 1/1974 | Revov | 40/39 |
| 3,812,815 | 5/1974 | Kuenzel | 116/28 R |
| 3,974,369 | 8/1976 | Chmela et al. | 240/6.4 R |

Primary Examiner—John W. Caldwell
Assistant Examiner—Donnie L. Crosland
Attorney, Agent, or Firm—Huebner & Worrel

[57] ABSTRACT

A visually detectable warning device particularly suited for use by cyclists in attracting the attention of others, particularly motorists. The device is characterized by a flexible staff adapted to be mounted on a bicycle, a transparent housing rotatably mounted on the staff, and a lamp and reflector mounted in the housing for directing therefrom a sweeping beam of light from the housing. The housing is characterized by an annular array of uniformly spaced vanes which serves to impart to the housing rotary motion in response to an impinging stream of air resulting from motion imparted to the bicycle.

12 Claims, 11 Drawing Figures

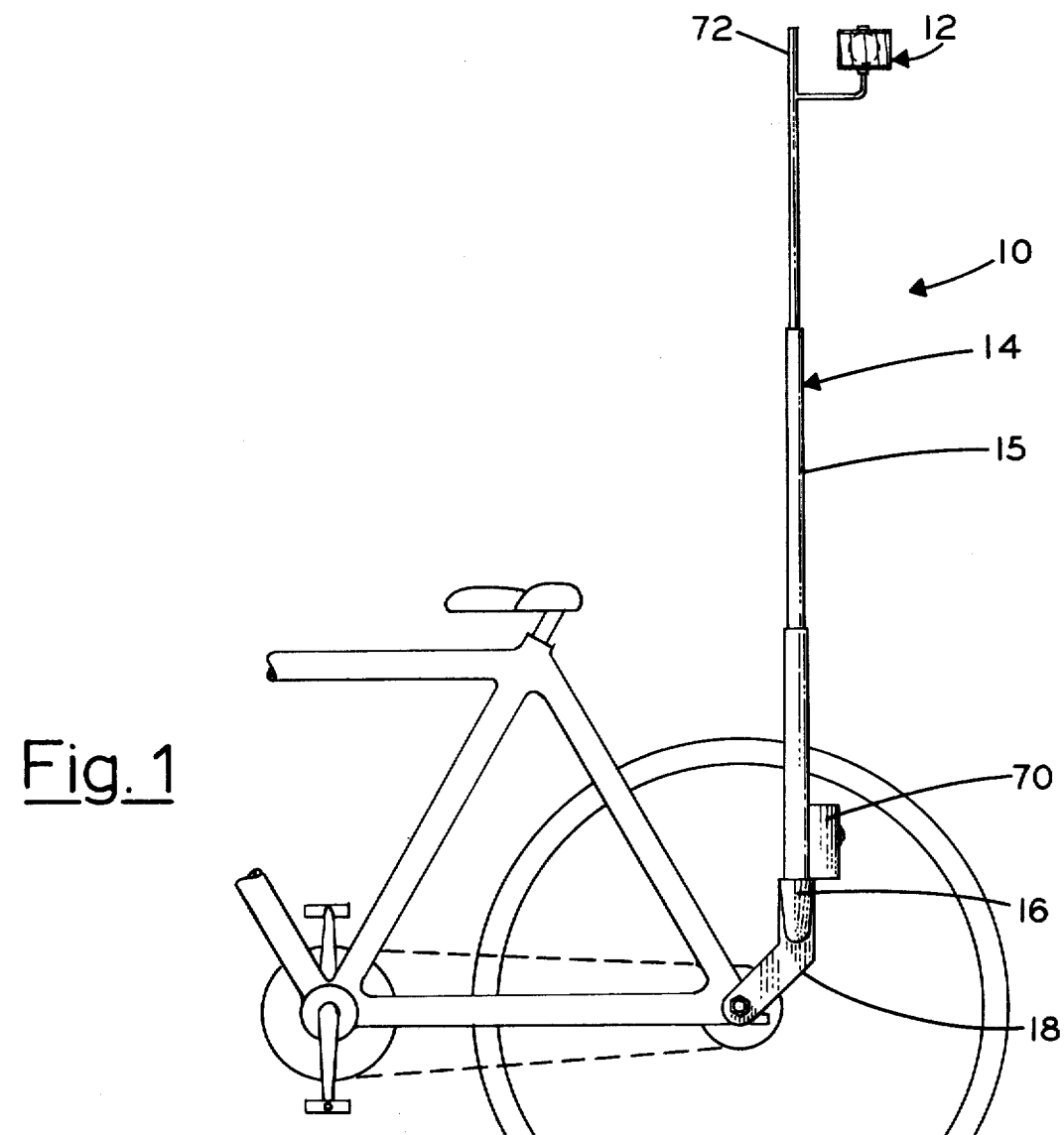
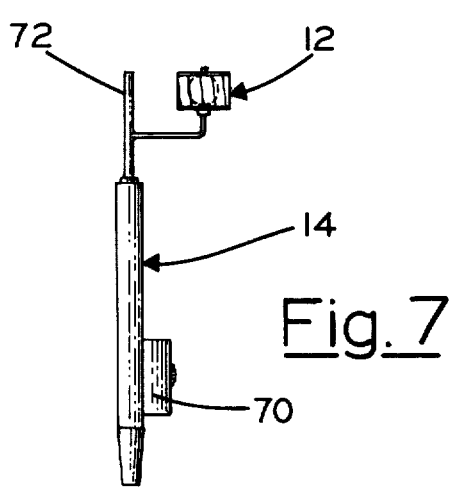
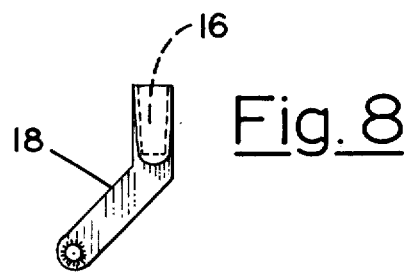
Fig. 1
Fig. 7
Fig. 8

A ROTATING BEACON FOR A BICYCLE

CROSS REFERENCE

This application is a continuation-in-part of U.S. Patent application Ser. No. 548,254, filed Feb. 10, 1975, now abandoned.

BACKGROUND OF THE INVENTION

The invention generally relates to visually detectable warning devices, and more particularly to a visually detectable warning device particularly suited for use by cyclists in attracting the attention of others, such as motorists and the like, during hours of darkness.

Recently, there has been an upsurge in interest in various programs designed to enhance physical fitness. This, in turn, has lead to an increased usage of bicycles as a mode of conveyance. Consequently, there has been placed on the streets and highways greater numbers of bicycles, which, inherently, tend to increase the risk of collision between motorists and cyclists.

A typical warning device currently employed by cyclists in attracting the attention of motorists includes a flexible staff, adapted to be connected at its base to the rear axle of the bicycle, having a pennant of a brilliant hue connected at the uppermost end thereof. Of course, motion of a bicycle, having such a device mounted thereon, imparts a waving motion to the pennant for purposes of attracting the attention of motorists in the vicinity of cyclists using the device. While such devices have enjoyed substantial success, the effectiveness thereof tends to be limited to the daylight hours, since the pennants are not readily detectable during hours of darkness.

Of course, the use of reflectors and battery-powered lamps mounted on a bicycle for purposes of enhancing detection, as well as enhancing the visibility of the cyclist, is notoriously old. Unfortunately, the lamps usually are directed forwardly from the bicycle upon which they are mounted and often are insufficient for attracting the attention of motorists. Reflectors are subject to similar deficiencies. As a consequence, the likelihood that cyclists will remain undetected by a motorist, even though equipped with reflectors and battery-powered lamps affixed to the bicycle, remains substantially great.

It should be readily apparent that there currently exists a need for a visually detectable warning device particularly suited for use by cyclists in attracting the attention of motorists during the hours of darkness, and it is, therefore, the general purpose of the instant invention to provide a visually detectable warning device which is particularly suited for use by cyclists in attracting the attention of others, such as motorists and the like, during hours of darkness.

OBJECTS AND SUMMARY OF THE INVENTION

It is, therefore, an object of the instant invention to provide a visually detectable warning device which overcomes the aforementioned objections and disadvantages.

It is another object to provide a visually detectable warning device particularly suited for use by cyclists in attracting the attention of others.

It is another object to provide a visually detectable warning device particularly suited for use by cyclist, in hours of darkness, for attracting attention of motorists and the like.

It is another object to provide a visually detectable warning device including a lamp for projecting a sweeping beam supported by a flexible staff and adapted to be removably mounted on a bicycle.

It is another object to provide a device adapted to be removably mounted on a bicycle and which is responsive to a stream of air passing thereover for projecting a sweeping beam of light for alerting others of the presence of an equipped bicycle.

It is another object to provide a visually detectable warning device which can readily be mounted and dismounted on a bicycle by a cyclist and employed for use in attracting the attention of motorists during hours of darkness.

It is another object to provide a visually detectable warning device particularly suited for use by cyclists in attracting the attention of others during hours of darkness which can be readily mounted and removed from a bicycle and stowed in convenient space, such as lockers provided in public school facilities.

It is another object to provide a visually detectable warning device which is particularly suited for use by cyclists in attracting the attention of others, although not necessarily restricted in utility thereto, since the device may be employed by pedestrians, motorists and others desiring detection.

These together with other objects and advantages are achieved through the use of a rotatable beacon comprising a transparent housing having mounted therein a battery-powered lamp adapted to respond to an air stream passing thereover for projecting a sweeping beam of light, and a flexible, stowable staff for supporting the housing for rotation and adapted to be releasably mounted on a bicylcle and employed as a visually detectable warning device.

BRIEF DESCRIPTION OF THE DRAWINGS

FIG. 1 is a fragmented view of a visually detectable warning device which embodies the principles of the instant invention, including a rotatable housing, including a lamp supported by a flexible staff adapted to be mounted on a bicycle and project a sweeping beam of light.

FIG. 7 is an elevational view of the device shown in FIG. 1, but with the staff being in an axially collapsed configuration for stowage purposes.

FIG. 8 illustrates a socket adapted to be mounted on a bicycle for receiving the staff shown in FIGS. 1 and 2.

DESCRIPTION OF THE PREFERRED EMBODIMENT

Figure 2:
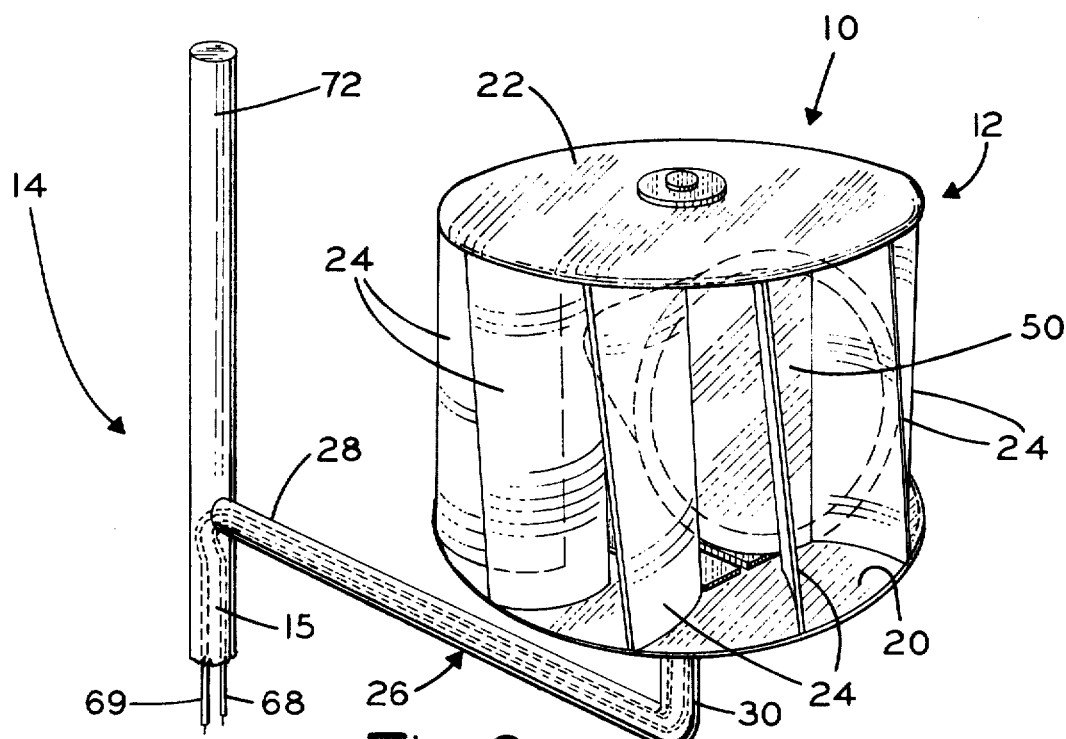
FIG. 2 is a fragmented perspective view of the rotatable housing shown in FIG. 1.
Figures 4, 5, 6:
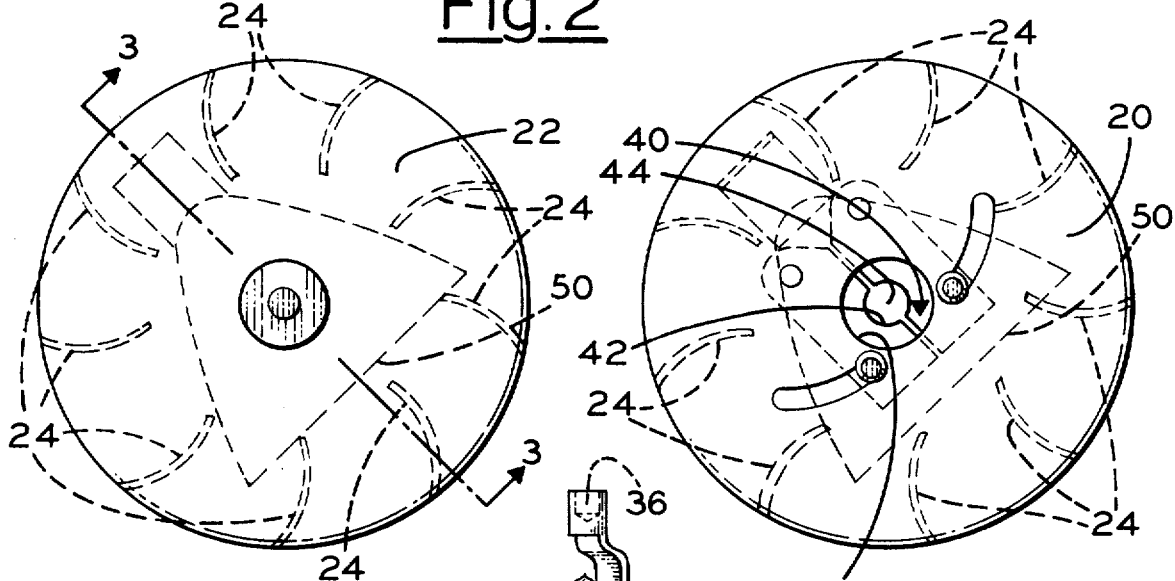
FIG. 4 is a top plan view of the housing shown in FIG. 2.
FIG. 5 is a bottom plan view of the housing.
FIG. 6 is a fragmented view of a center post provided for supporting the lamp and housing shown in FIGS. 1 and 2.

Referring now to the drawings wherein like reference characters designate like or corresponding parts throughout the several views, there is shown in FIG. 1 a detectable warning device which embodies the principles of the instant invention.

The device 10, as shown in FIG. 1, includes a rotatable housing 12 supported for rotation by a flexible, tubular staff 14. The staff 14 is formed of a suitable material, such as a synthetic resin, and includes an elongated body 15 adapted to be received in a socket 16 provided in a bracket 18 adapted to be mounted on the rear axle of a bicycle, not designated. As should be apparent, the particular class of materials from which the staff is formed is not limited to synthetic resins and is varied as dictated by various parameters, such as costs, available manufacturing capabilities, and the like. As shown in FIGS. 1 and 7, the staff 14 includes a plurality of telescopically related segments.

The housing 12 includes a bottom and top plate, designated 20 and 22, respectively. These plates are similarly dimensioned and are of disk-shaped configurations and formed of a suitable lightweight material, including synthetic resins. The housing also includes a side wall comprising an annular array of uniformly spaced vanes 24 extended between the peripheral portions of the plates 20 and 22.

The array of vanes 24 is formed of transparent material and serves to impart rotary motion to the housing as a stream of air is passed thereover. In order to achieve this result, each of the vanes 24 is provided with a curved, cross-sectional configuration, FIG. 2, positioned to intersect a radial plane for the housing. While the number of vanes employed may be varied as desired, it is to be understood that a sufficient number of vanes is included for imparting rotary motion to the housing 12 as a stream of air is passed thereover. Preferably, each of the vanes 24 is inclined, with respect to the plates 20 and 22, in a direction which imparts lift to the housing.

The rotatable housing 12 is supported for rotation by a bracket, designated 26, affixed to the staff 14. The bracket 26, as shown in FIGS. 1 through 7, comprises an angulated member having a laterally extended base portion 28 which extends from the staff and terminates in an orthogonally related distal portion which is adapted to serve as a center post, designated 30, for the rotatable housing 12. Where desired, the base portion 28 is welded or otherwise rigidly affixed to the body 15 of the staff 14.

The center post 30 is extended through an opening 32 provided in the bottom plate 20 and includes a coaxially aligned terminal bracket, generally designated 33, formed of metal and rigidly affixed to the bracket 26. In order to support the rotatable housing 12 for rotation, the center post 30 includes a concentric bearing collar 34 disposed in juxtaposition with the terminal bracket 33 in a position to engage the housing 12 in supporting relation. At the distal end of the terminal bracket 33 there is provided a thrust bearing socket 36 which serves to receive a bearing pin 38 extended concentrically through the top plate 22 and rigidly affixed thereto whereby the housing is supported for rotation by the bearing collar 34 and bearing pin 38.

In order to releasably mount the rotatable housing 12 on the bracket 26, the bottom plate 20 of the housing is provided with a pair of pivotal jaws, designated 40, supported for pivotal motion relative to the opening 32, which serve to engage the bearing collar 34 in capturing relation. Each of the jaws 40 includes a semicircular relief 42 which collectively forms a bore 44 having a diameter slightly greater than the diameter of the center post 30, but less than that of the collar, whereby the housing is captured as the pivotal jaws 40 are closed beneath the collar 34.

It is important here to understand that the rotatable housing 12 is releasably supported by the center post 30 and can readily be removed therefrom simply by pivotally displacing the pair of jaws 40 through a distance sufficient to permit the collar 34 to be withdrawn from the housing. Similarly, when mounting the housing 12 on the center post 30, the center post 30 is inserted through the opening 32 until the bearing pin 38 seats in the socket 36, thereafter, the jaws 40 are closed for thus capturing the bearing collar 34.

Within the rotatable housing 12 there is provided an electrically energizable lamp, generally designated 50, which serves to project a beam laterally from the housing through the annular wall formed by the array of vanes 24. It will, of course, be appreciated that at least the vanes 24, which are interposed in the path of a beam of light projected from the lamp 50, are formed of a transparent material, such as a suitable synthetic resin which permits the light to project a non-occluded beam.

Figure 3:
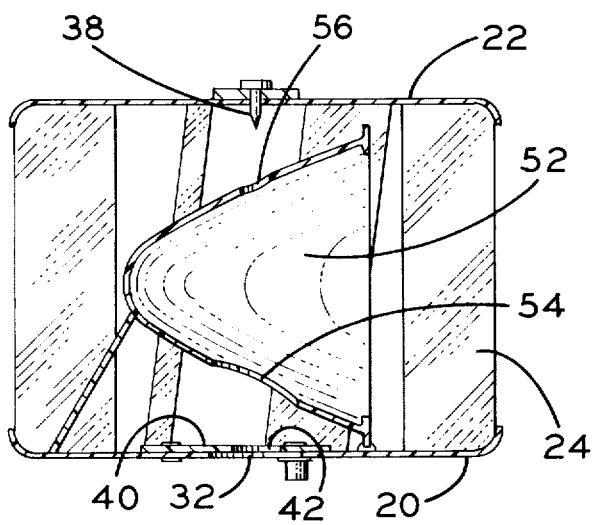
FIG 3 is a cross-sectional view of the housing shown in FIG. 1, with the lamp deleted for clarity.

The lamp 50 includes a curved reflector 52, rigidly secured to the housing 12, provided with a pair of coaxially aligned bores 54 and 56, FIG. 3, which serve to receive the terminal bracket 33. Within the reflector, mounted on the terminal bracket 33, there is a socket 58, FIG. 6, adapted to receive an electrically energizable lamp globe 60. As a practical matter, the socket 58 is of a U-shape configuration formed by a pair of spring-biased clip members 62 provided for receiving therein the base of the globe 60 in electrical contact therewith. Connected to and extended from the clips 62 is an electrical lead 64, the purpose of which will hereinafter become apparent. The socket 58 further includes a lip 66 upon which is seated the axial contact of the globe 60. Extended from the lip 66 is an electrical lead 68, the purpose of which, likewise, will hereinafter become apparent. It will, therefore, be appreciated that the clip 62 and lip 66 serve as electrical contacts for connecting the globe in a d.c. circuit between the leads 64 and 68.

Figure 11:
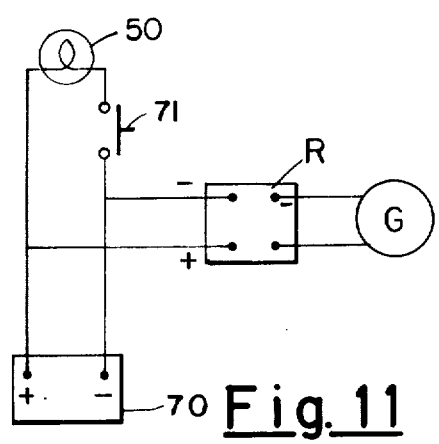
FIG. 11 is a schematic view illustrating suitable circuitry provided for the device.

In order to electrically energize the lamp 50, there is provided a battery pack 70 which is affixed to the base end portion of the body 15. The battery pack 70 includes electrical contacts, not shown, connected with the leads 64 and 68 through a suitable switch 71. The battery pack serves to receive a plurality of dry-cell batteries, in a manner well understood by those familiar with battery-powered electrically energizable lamps. As a practical matter, the leads 64 and 68 are encased within the staff 14 as they extend between the globe 60 and the battery pack 70. A generator G, FIG. 11, also is connected to the leads 64 and 68, with a rectifier R, including a plurality of diodes, being interposed between the generator and leads. The rectifier is provided in order that a d.c. current be supplied by the generator to the lamp while power drainage through the generator is avoided. The rectifier may be either a full-wave or half-wave rectifier as desired. Since such devices are well known, a detailed description thereof is omitted.

The lamp 50 now can be used with the battery pack 70 alone, without the generator, or conversely, with the generator alone, without batteries in the battery pack; or the lamp can be used with both the generator and the battery pack, supplying the lighting current simultaneously, when the bicycle is in motion, thus prolonging the life of the batteries of the battery pack; or the generator can be used, not only to supply all the current to light the lamp 50, but also to recharge the battery pack simultaneously; or the generator can also be used to recharge the battery pack when the lamp is switched off through the aforementioned switch.

When the generator and battery pack 70 are being used together the current supply to the globe 60 will alternate automatically between the generator and the battery pack without attention from the user of the bicycle. That is, when the bicycle is stopped such as at an intersection, street corner, roadside, or the bicycle is being walked across a street, etc., and the generator is not generating electricity, the battery pack will keep the globe energized. This is important and highly desirable from the standpoint of safety and cannot be done without the use of the aforementioned rectifier, because without the rectifier the battery pack will tend to discharge through the generator winding.

Also, if nickel-cadmium batteries are used in the battery pack, the rectifier will allow use of a small transformer to recharge the battery pack whether the user has a bicycle generator or not. Such transformers employ house current and are used for slot car sets or electrical trains and currently are commercially available.

As illustrated in FIG. 1, the staff 14 is provided, where so desired, with an extension 72 which serves as an impact shield for the rotatable housing 12. The extension 72 is coaxially aligned with the body 15 of the staff and is projected slightly above the housing 12, whereby the housing is shielded from impacting limbs and similar obstructions of a type which may be encountered during operation. Furthermore, where desired, the extension 72 serves as a base for mounting a pennant.

Figure 10:
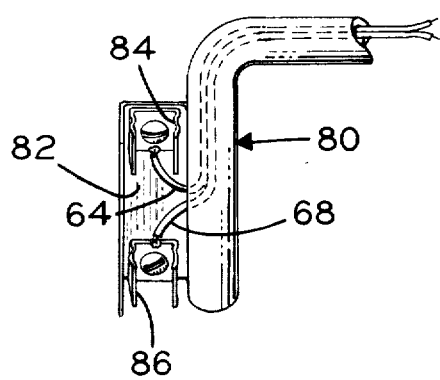
FIG. 10 is a fragmented view illustrating clips provided for removably mounting the warning device on the non-collapsible staff shown in FIG. 9.
Figure 9:
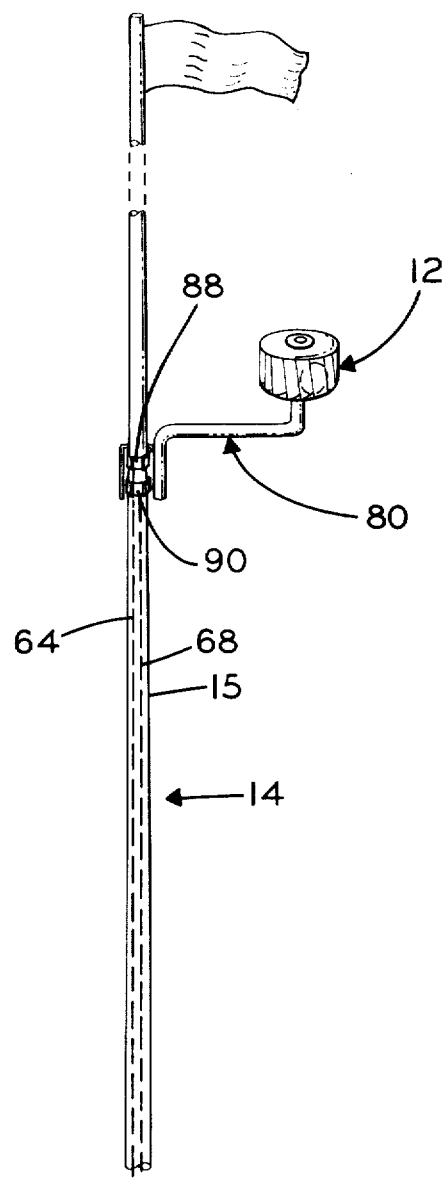
FIG. 9 is a fragmented view of the warning device adapted to be removably mounted on a flexible, non-collapsible staff.

In some instances, it is found desirable to provide for a removal of the bracket 26 from the body 15 of the staff 14. In such instances, as illustrated in FIGS. 9 and 10, in lieu of the bracket 26 there is provided a removable arm 80 upon which is mounted the rotatable housing 12. The housing 12 is mounted on the arm 80 in a manner substantially the same as that in which the rotatable housing is mounted on the bracket 26, as aforedescribed. It is noted, however, that the arm 80 includes a mounting bracket 80 including terminal clips 84 and 86 which serve to receive therebetween electrical contacts 80 and 90 rigidly affixed to the body 15 of the staff 14. The terminal clips 84 and 86 are electrically connected with the leads 64 and 68, while the clips 84 and 86 are electrically connected with the power pack 70 through a pair of electrical leads, not designated. It should, therefore, be apparent that the arm 80 may be removed and thus disconnected from the staff 14 by disconnecting the clips 84 and 86 from the terminals 88 and 90. Through a use of the removable arm 80, it is possible to employ a non-collapsible staff, as illustrated in FIG. 9 which can be rigidly secured to the bracket 18, where so desired.

OPERATION

It is believed that in view of the foregoing description, the operation of the device will readily be understood and it will be briefly reviewed at this point.

With the device 10 assembled in the manner hereinbefore described, the staff 14, where telescopic sections are employed, can be removed from the socket 16 and telescopically collapsed for purposes of stowage. For similar reasons, the removable arm 80 can be removed from the staff 14.

Regardless of whether the bracket 26, or the arm 80, is employed, the rotatable housing 12 is supported at the uppermost end of the staff 14 which is particulary adapted to be mounted on a given bicycle. As the bicycle, equipped with the device 10, is propelled by a cyclist, an air stream is caused to pass over the rotatable housing 12 for thus causing the housing to rotate as it is supported by the bearing collar 34 and the bearing pin 38. As rotation is imparted to the rotatable housing 12, the reflector 52 of the lamp 50 describes a circle about the globe 60 for thus projecting the beam of light through the annular side wall of the housing. Thus, a sweeping beam of light is projected from the housing which tends to alert others of the presence of the cyclist.

As a practical matter, the power pack is selectively switched on and off for connecting the globe 60, through the circuit leads 64 and 68, with dry-cell batteries disposed within the power pack 70.

It has been found preferable to mount a pennant on the uppermost end of the staff 14, whereby the staff is adapted to serve as a visual warning device during the daylight hours, while the lamp 50 serves to project a sweeping beam of light during hours of darkness. Thus, the device 10 serves as a warning device for alerting others of the presence of the cyclist employing the device in daylight hours as well as hours of darkness.

In view of the foregoing, it should readily be apparent that the device of the instant invention provides a practical solution to the perplexing problem of alerting others to the presence of cyclists and the like during hours of darkness as well as daylight hours.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A rotating beacon particularly suited for use by cyclists as a device for attracting the attention of others, comprising:
    A. a rotatable transparent housing;
    B. means supporting said housing for rotary motion about a given axis including a staff having an elongated body extended between a base end portion and a distal end portion, means connecting said housing to the distal end portion of the staff, and bracket means adapted to removably mount the base end portion of said staff on a bicycle;
    C. means responsive to an impinging stream of air for imparting rotary motion to the housing; and
    D. means for directing a beam of light from said housing in a fixed directional relationship therewith, whereby a sweeping beam of light is projected from said housing as rotary motion is imparted thereto.

2. The beacon of claim 1 wherein said means for directing a beam of light includes a curved reflector rigidly affixed to said housing and having a focal point substantially located on said given axis, and an electrically energizable lamp globe supported on the axis of said reflector.

3. The beacon of claim 2 wherein the means connecting said housing to the distal end portion of said staff includes an angulated bracket having a first portion extended from the body of said staff, and a second portion angularly related to said first portion and extended in substantial parallelism with said body.

4. A rotating beacon particularly suited for use by cyclists for attracting the attention of others, comprising:
   A. a rotatable transparent housing;
   B. means supporting said housing for rotary motion about a given axis including a staff having an elongated body extended between a base end portion and distal end portion including an angulated bracket having a first portion extended from the body of said staff, and a second portion angularly related to said first portion and extended in substantial parallelism with said body including a terminal bracket extended concentrically through said housing, and means for rotatably connecting the housing to the terminal segment of the bracket;
   C. means responsive to an impinging stream of air for imparting rotary motion to the housing; and
   D. means for directing a beam of light from said housing in fixed relationship therewith including a curved reflector rigidly affixed to said housing having a focus substantially located on said given axis and an electrically energizable lamp globe supported on the axis of said reflector, whereby a sweeping beam of light is projected from the housing as rotary motion is imparted thereto.

5. The beacon of claim 4 further comprising:
   A. a first pair of electrical contacts, each being of an annular configuration, mounted on said body in circumscribing relation therewith;
   B. circuit means including a source of electrical energy connected to said contacts, and manipulatable switch means interposed between the electrical contacts and the source of electrical energy;
   C. coupling means for releasably connecting the angulated bracket to the body of said staff including means defining a second pair of electrical contacts for electrically engaging said first pair of electrical contacts; and
   D. means for electrically connecting said second pair of contacts with said lamp.

6. The beacon of claim 5 wherein said source of electrical energy comprises a power pack including a container mounted on said staff adapted to receive a plurality of dry-cell batteries.

7. The beacon of claim 6 wherein said source of electrical energy further comprises an a.c. generator and switch means for connecting said generator with said circuit means and a rectifier interposed between said generator and said circuit means.

8. A rotating beacon beam particularly suited for use by cyclists for attracting the attention of others, comprising:
   A. a rotatable transparent housing;
   B. means supporting said housing for rotary motion about a given axis including a staff having an elongated body extended between a base end portion and distal end portion, means connecting said housing to the distal end portion of the staff, and bracket means adapted to removably mount the base end portion of the staff on a bicycle;
   C. means responsive to an impinging stream of air for imparting rotary motion to the housing including an annular array of uniformly spaced vanes; and
   D. means for directing a beam of light from said housing in a fixed directional relationship therewith, whereby a sweeping beam of light is projected from said housing as rotary motion is imparted thereto.

9. The beacon of claim 8 wherein said housing includes a pair of circular plates disposed in mutual parallelism, and each vane of said array is extended between the plates in an inclined relationship with at least one plate of said pair.

10. The beacon of claim 9 wherein each of said vanes is characterized by an arcuate, transverse cross-sectional configuration.

11. A rotating beacon beam particularly suited for use by cyclists for attracting the attention of others, comprising:
    A. a rotatable transparent housing including a pair of circular plates disposed in coaxial alignment;
    B. means for supporting said housing for rotary motion about a given axis including a staff having an elongated body extended between a base end portion and distal end portion, means connecting said housing to the distal end portion of said staff including a center post mounted on said staff and extended axially through at least one plate of said pair of plates, and bearing means connecting the housing to the center post comprising a bearing collar affixed to the center post, a pair of manipulatable jaws pivotally connected to said one plate adapted to be pivoted into releasable engagement with said bearing collar, and means defining a thrust bearing interconnecting said center post to the other plate of said pair, and bracket means adapted to removably mount the base end portion of said staff on a bicycle;
    C. means responsive to an impinging stream of air for imparting rotary motion to the housing; and
    D. means for directing a beam of light from said housing in fixed directional relationship therewith, whereby a sweeping beam of light is projected from said housing as rotary motion is imparted thereto.

12. In combination with a bicycle, a visually detectable warning device comprising a beacon including a housing, an elongated staff having a base end portion and a distal end portion, means releasably securing the base end portion of said staff to said bicycle with the distal end portion thereof being projected substantially upwardly therefrom, when the bicycle is in an operative configuration, means for generating a beam of light including a light source comprising an electrically energizable lamp disposed in said housing for propagating a beam of light from the housing, and means rotatably connecting said housing to the distal end portion of said staff.

* * * * *